J. Armstrong, Jr.

Cultivator.

N° 88,940. Patented Apr. 13, 1869.

Witnesses,
R. T. Campbell,
J. N. Campbell

Inventor
Jas. Armstrong Jr.

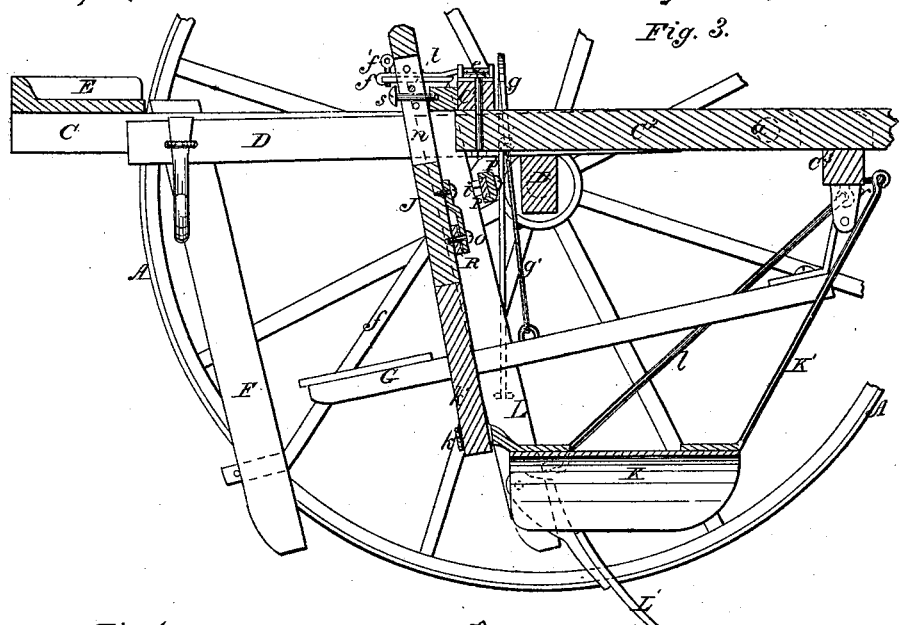
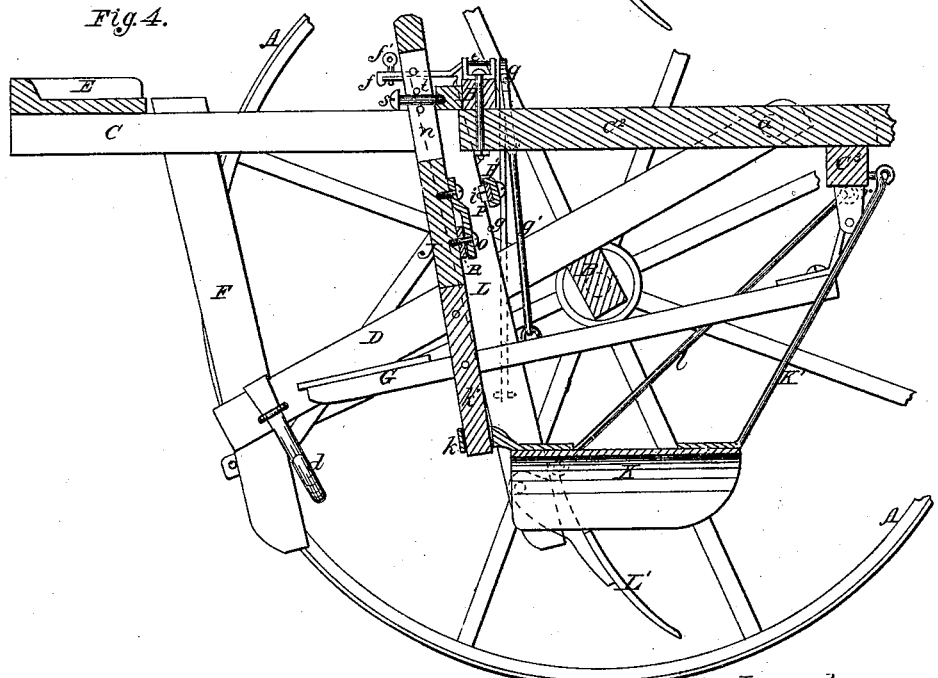

United States Patent Office.

JAMES ARMSTRONG, JR., OF ELMIRA, ILLINOIS.

Letters Patent No. 88,940, dated April 13, 1869.

IMPROVEMENT IN GUARD-ATTACHMENT FOR CULTIVATORS.

The Schedule referred to in these Letters Patent and making part of the same.

*To all whom it may concern:*

Be it known that I, JAMES ARMSTRONG, Jr., of Elmira, in the county of Stark, and State of Illinois, have invented a new and improved Guard-Attachment for a Cultivator; and I do hereby declare that the following is a full, clear, and exact description thereof, reference being had to the accompanying drawings, making part of this specification, in which—

Figure 1:
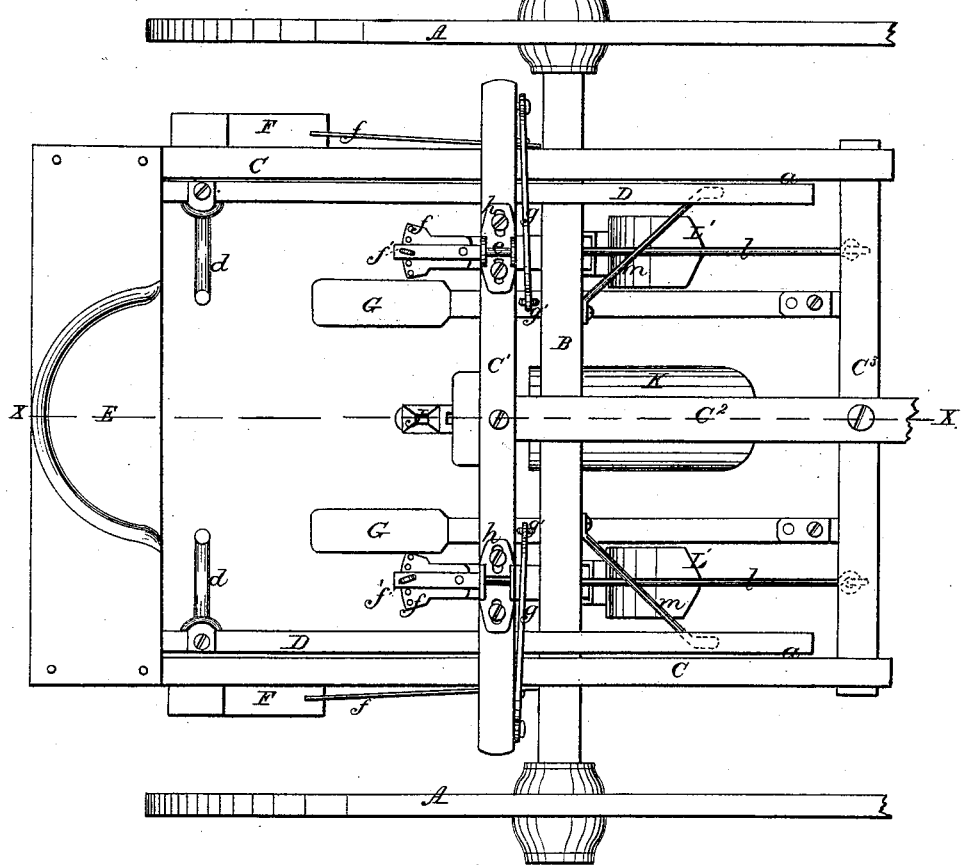

Figure 1, sheet 1, is a plan view of a cultivator having my improvements applied to it.

Figure 2:
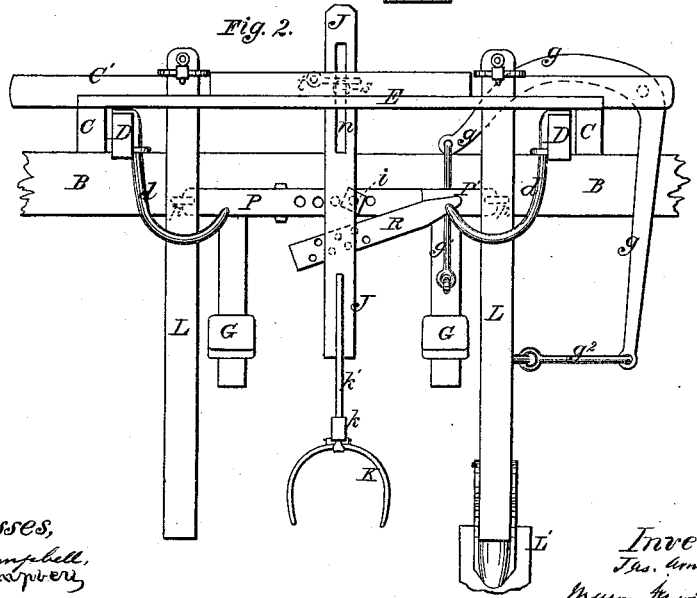

Figure 2, sheet 1, is a rear elevation of the guard-attachment.

Figure 3, sheet 2, is a longitudinal section through the cultivator and guard-attachment, in the vertical plane indicated by line $x\ x$ in fig. 1, showing the parts in position for operation.

Figure 4, sheet 2, is a similar view of the same parts, as shown in fig. 3, indicating the hoes and guard raised free from the ground.

Similar letters of reference indicate corresponding parts in the several figures.

This invention relates to a new and improved mode of attaching to a cultivator, which has laterally-swinging standards, a guard, or plant-fender, that will prevent young plants from being covered, or injured by the loose earth thrown up by the shovels.

One object of my invention is to so attach a guard or plant-fender to a cultivator, that such fender is allowed to adjust itself vertically, and thereby conform to the inequalities of the surface over which it is drawn, and, at the same time, be allowed to receive a lateral motion in harmony with those shovel-standards which are arranged on opposite sides of it, as will be hereinafter explained.

Another object is to attach a vertically and laterally-adjustable or swinging plant-guard, or fender, to laterally-swinging shovel-standards, which latter are adapted for being set at different distances apart, and to provide for maintaining a central position of the said guard between said standards, whatever distance they may be set apart, as will be hereinafter explained.

To enable others skilled in the art to understand my invention, I will describe its construction and operation.

In the accompanying drawing, I have represented my improved plant-guard, or fender applied to a two-wheel corn-cultivator, for which Letters Patent of the United States were granted to me, on the 19th day of February, 1867. I do not, therefore, claim under this petition anything which is shown and described in said Letters Patent.

A A are two carriage-wheels, which are applied on the ends of an axle, over which pass two longitudinal beams, C C, carrying on their rear ends a transverse seat-board, E, and having their front ends pivoted at $a\ a$ to the front ends of two longitudinal levers, D D, as shown in fig. 1.

The front ends of the seat-beams C C, are secured together by means of a transverse bar, $C^3$, and, at an intermediate point between this bar $C^3$ and the seat-board E, a transverse bar, $C^1$, is secured to the two longitudinal beams C C, and arranged just in rear of the axle B, to which beam $C^1$ the two front shovel-standards L L are attached.

The draught-pole $C^2$ is rigidly secured to the front bar $C^3$, and to the intermediate bar $C^1$, so that in the act of depressing the rear ends of the levers D D, the beams C C, together with the rear end of the draught-pole, will be raised bodily above the axle, carrying with them the shovel-standards and plant-fender, as shown in fig. 4.

The levers D D extend out in rear of the axle, and are secured rigidly thereto, and to the rear ends of these levers, stirrups, $d\ d$, are secured, by means of which the attendant, whilst riding upon the machine, can raise the shovels free from the ground, by simply transferring his weight from seat E to said stirrup.

The rear shovel-standards F F are secured rigidly to the beams C C, and braced against backward thrust of the inclined rods $f\ f$.

The front shovel-standards L L are attached to the cross-beam $C^1$ by laterally-swivelling connections, $e\ e$, applied to laterally-adjustable bearings, $h\ h$, on this beam, substantially as described in my Letters Patent, above referred to.

This mode of attaching the standards L L will allow their lower ends, carrying shovels $L'\ L'$, to vibrate laterally, which movement is imparted to them by the treadles G G, connecting-rods $g'\ g'$, and bent levers $g$.

The standards L L are connected together by an extensible brace, P P', and by alternately depressing treadles, G G, the attendant, whilst sitting on seat-board E, in rear of the front shovels $L'\ L'$, can guide these shovels to the right or left and follow a row of plants with great precision.

The upper ends of standards L L are connected to the swivelling-pins $e\ e$ by vertical pivots, and also by pins, $f'$, passing through holes made through segments, $f$. This will allow the shovels to be adjusted for throwing more or less earth about the plants.

These standards L L are sustained against backward thrust by the inclined rods $l\ l$, which are linked to eyes on said standards, and similarly attached to the front brace or bar $C^3$.

Having given a general description of the machine to which my invention is applied, I will now proceed to describe my improvements, and the manner of applying them to such machine.

K represents an arched plant-fender, adapted for passing over the plants, and protecting them from being covered or injured by earth thrown up by the side-shovels $L'$. This fender may be made of any suitable length and shape, with its front end sloping downward like a sled-runner, for passing freely over the rows.

It is suspended at its front end by a rod, $K'$, which is pivoted, or linked to the front bar $C^3$, so as to allow the fender to vibrate laterally, and to hold its front end down in place.

The rear end of this fender has an offset, $k$, extending back from its rear end, through which passes freely a metallic extension of a standard, J, as clearly shown in figs. 2, 3, and 4.

The lower end of this extension is hooked, or otherwise made so as to prevent the fender from becoming detached from it.

This attachment of the fender to the standard J will allow the rear end of the former to rise and descend freely, and vibrate vertically about the front connection of rod K' with the bar $C^3$.

The fender-standard J is connected to the rear side of cross-beam $C^1$ by means of a stud, or pivot, $s$, passed through a vertically-oblong slot, $n$, made through the standard near its upper end.

This slot $n$ will allow the standard J to be adjusted up or down, so as to have the fender run at any desired point, and the pin $t$, which is passed through one of a number of holes made through this standard J, affords a bearing for the latter upon the pivot $s$.

The standard J is arranged between and parallel to the two shovel-standards L L, and is held centrally between these standards, and caused to vibrate laterally with them, by means of a connecting-rod, R, which is pivoted at one end to the section P' of the extensible brace of said standards, (or, if desired, to one of the standards L,) and connected at or near the other end to the central-fender standard, by a pin, or pivot, $o$, shown in figs. 3 and 4.

There are several holes made through the rod R for receiving the pin $o$, and keeping the standard J centrally in place between the standards L L, at whatever distance apart it may be required to adjust these latter standards.

From the above description, it will be seen that while the plant-fender K is allowed to rise and descend freely, for the purpose of passing over clods, corn-stalk roots, or uneven ground, this fender can be adjusted either to the right or left, in harmony with similar movements given to the front-shovel standards by the feet of the operator upon treadles G G; and it will also be seen that the fender-standard J will always maintain a central position between the shovels, whatever distance apart it may be required to adjust these shovels.

I have described two methods of allowing the fender to adjust itself vertically—one consisting in a sliding joint at the upper part of the fender-standard, with a removable pin, $t$, for adjusting this standard higher or lower to suit the different sizes of plants, the condition of the land, &c., and the other consisting in allowing the fender to receive movements up and down independent of the fender-standard.

I may combine both of these methods, or I may use either one of them separately. If the vertical motion of the fender is allowed only at the bottom of the standard J, this standard will be connected to the cross-beam $C^1$ by a pivot-joint.

The outer ends of the two pieces P P' should be connected to their standards L L by means of staples, or other loose joints, which will allow these standards free play about their pivots $e\ e$, as well as allow them to be adjusted so as to incline the shovels more or less inward, as may be required.

Having described my invention,

What I claim as new, and desire to secure by Letters Patent, is—

1. The vertically-movable standard J of the plant-fender, attached to the cross-beam $C^1$ by means of a sliding joint formed by the slot $n$, pivot-pin $s$, and adjustable bearing-pin $t$, substantially as described.

2. The vertically self-adjustable fender-standard J, pivoted to the shovel-carrying frame of a cultivator, and connected to laterally-vibrating shovel-standards, L L, substantially as described.

3. The slotted extension $k$ on the rear end of a plant-fender, K, which is connected by rod $K^1$ to the shovel-carrying frame, in combination with the lower extension $k'$ of the standard J, passed loosely through said extension $k$, and adapted for allowing the fender to rise and descend, but keeping it in place centrally between the laterally-movable shovel-standards L L, substantially as described.

4. The laterally-vibrating and laterally-adjustable standards L L, in combination with the centrally-arranged fender-carrying standard J, the extensible brace P P', and the adjustable connecting-rod R, substantially as and for the purpose described.

5. A plant-fender K, attached to a cultivator-frame by means of a front laterally and vertically-vibrating suspension rod, K', and a rear laterally and vertically-vibrating connection, in such manner that while the fender will swing laterally with the shovels L' L', it is at the same time, allowed to rise freely over obstructions in its path, substantially as described.

JAMES ARMSTRONG, JR.

Witnesses:
WILLIAM STEVENSON,
ABEL ARMSTRONG.